(No Model.)
T. F. REILLEY.
BAIL EAR.
No. 387,182. Patented July 31, 1888.
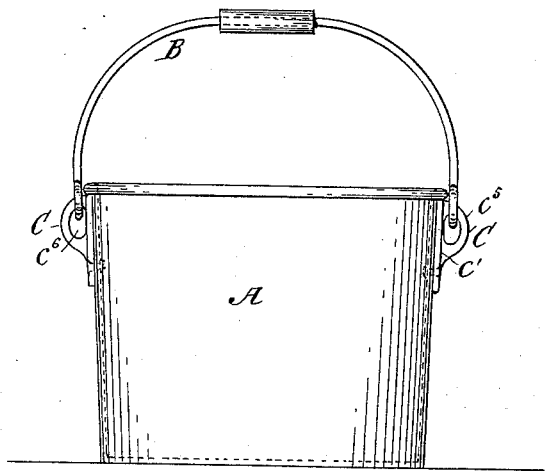
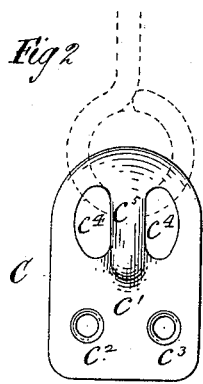
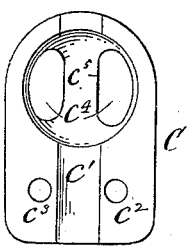
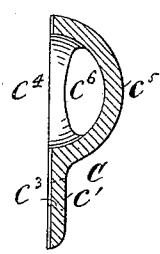
Witnesses
Geo. Wadman
James G. Greves
Inventor
Terence F. Reilley,
by Philip J. O'Reilly,
his attorney.
N. PETERS, Photo-Lithographer, Washington, D. C.

UNITED STATES PATENT OFFICE.

TERENCE F. REILLEY, OF NEW YORK, N. Y., ASSIGNOR OF ONE-HALF TO RICHARD S. REILLEY, OF SAME PLACE.

BAIL-EAR.

SPECIFICATION forming part of Letters Patent No. 387,182, dated July 31, 1888.

Application filed February 15, 1888. Serial No. 264,106. (No model.)

*To all whom it may concern:*

Be it known that I, TERENCE F. REILLEY, of the city of New York, in the county and State of New York, have invented a new and useful Improvement in Bail-Ears for Buckets, Pails, and Analogous Vessels, of which the following is a specification.

My invention relates to the ears of buckets, pails, and analogous vessels to which the bails thereof are connected.

In the accompanying drawings, Figure 1 is a side view of a bucket and bail having my improvement applied thereto. Fig. 2 is a front view of an ear constructed according to my invention. Fig. 3 is a rear view of the same, and Fig. 4 is a vertical central section thereof.

Similar letters refer to similar parts throughout the several figures.

A designates an ordinary bucket.

B is a bail of the usual form.

C C are the ears which are secured to the bucket, with their eyes below the rim thereof. Each of these ears comprises a base portion, $c'$, provided with rivet-holes $c^2$ $c^3$, and having an opening, $c^4$, near its upper side, with a loop-piece, $c^5$, extending vertically across the same, forming an eye, $c^6$, whose axis is horizontal and parallel with the side of the bucket, and through which the ends of the bail may be passed and bent to form a loop, as shown in dotted outline in Fig. 2.

By my improvement a broken bail may be easily removed without disturbing the ear. The points of suspension are brought very close to the sides of the bucket, and the ears, being below the rim of the bucket, are not exposed to injury. Besides, it is found in practice that the bails may be connected thereto more rapidly and with less danger of breaking in the operation of forming the loops.

The ears may be cast of malleable iron or other suitable material, with the loop portion and rivet-holes therein integral, without requiring a core, or they may be stamped in the form described from sheet metal at one operation.

What I claim as new, and desire to secure by Letters Patent, is—

1. The combination, with a vessel and a bail therefor, of ears, each of which is made in one integral piece, and comprising a base portion fitted to the side of said vessel and provided with rivet-holes, and an opening near its upper end, with a loop-piece extending vertically across the same, substantially as described.

2. A bucket-ear made in one integral piece, having a base portion to fit the side of a bucket, and an opening near its upper end, with a loop-piece extending vertically across the same, substantially as described.

TERENCE F. REILLEY.

Witnesses:
PHILIP J. O'REILLY,
D. H. DRISCOLL.